(12) United States Patent
Kruglick

(10) Patent No.: US 9,603,012 B2
(45) Date of Patent: Mar. 21, 2017

(54) SECURE WIRELESS DEVICE CONNECTION USING POWER LINE MESSAGES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 108 days.

(21) Appl. No.: 14/390,383

(22) PCT Filed: Aug. 19, 2013

(86) PCT No.: PCT/US2013/055607
§ 371 (c)(1),
(2) Date: Oct. 2, 2014

(87) PCT Pub. No.: WO2015/026318
PCT Pub. Date: Feb. 26, 2015

(65) Prior Publication Data
US 2015/0382187 A1     Dec. 31, 2015

(51) Int. Cl.
| H04L 9/00 | (2006.01) |
| H04W 12/04 | (2009.01) |
| H04L 29/06 | (2006.01) |
| H04B 3/54 | (2006.01) |

(52) U.S. Cl.
CPC .............. *H04W 12/04* (2013.01); *H04B 3/54* (2013.01); *H04L 63/18* (2013.01); *Y04S 40/24* (2013.01)

(58) Field of Classification Search
CPC .......... H04W 12/04; H04L 63/18; H04B 3/54
See application file for complete search history.

(56) References Cited

U.S. PATENT DOCUMENTS

| 7,350,069 B2 | 3/2008 | Herz et al. |
| 7,427,926 B2 | 9/2008 | Sinclair et al. |
| 7,660,989 B2 | 2/2010 | Tomkow |
| (Continued) | | |

FOREIGN PATENT DOCUMENTS

WO    2012010735 A1    1/2012

OTHER PUBLICATIONS

"BlueTooth Phone Vulnerability," accessed at: http://web.archive.org/web/20130424004026/http://www.acmetech.com/blog/2005/04/13/bluetooth-phone-vulnerability/, accessed on Sep. 19, 2014 pp. 1-4.

(Continued)

*Primary Examiner* — Jayesh Jhavei
(74) *Attorney, Agent, or Firm* — Turk IP Law, LLC

(57) ABSTRACT

Technologies are generally provided to establish a secure connection between a wireless network access point and a wireless enabled device by sharing a secret key synthesized from one or more messages exchanged over power lines. Messages exchanged between devices within a location such as a household over power lines and/or with a power utility control center may be collected, for example, communication messages between a wireless enabled device and a smart meter or any other device. The wireless enabled device and a wireless network access point may synthesize a secret key from the collected messages and share the secret key to establish a secure wireless connection over a channel that is not secure.

18 Claims, 7 Drawing Sheets

(56) References Cited

U.S. PATENT DOCUMENTS

| | | | |
|---|---|---|---|
| 7,941,833 B2 | 5/2011 | Zick et al. | |
| 7,966,660 B2* | 6/2011 | Yermal | H04L 63/1416 726/22 |
| 8,873,758 B2* | 10/2014 | Bradley | H04W 8/005 380/270 |
| 2007/0036353 A1* | 2/2007 | Reznik | H04B 7/0434 380/30 |
| 2007/0188323 A1 | 8/2007 | Sinclair et al. | |
| 2008/0039020 A1 | 2/2008 | Eskin | |
| 2009/0214028 A1* | 8/2009 | Schneider | H04L 9/0844 380/44 |
| 2011/0084799 A1* | 4/2011 | Ficko | G07C 9/00904 340/5.65 |
| 2011/0314163 A1 | 12/2011 | Borins et al. | |
| 2012/0082312 A1* | 4/2012 | Liu | H04L 9/0863 380/262 |
| 2012/0198551 A1* | 8/2012 | Whitney | H04L 63/1491 726/23 |
| 2012/0280832 A1* | 11/2012 | Jonsson | G01D 4/00 340/870.02 |
| 2012/0324242 A1 | 12/2012 | Kirsch | |
| 2012/0331296 A1* | 12/2012 | Levin | H04L 9/0825 713/170 |
| 2013/0130621 A1* | 5/2013 | Kim | H04B 5/0037 455/39 |
| 2014/0037092 A1* | 2/2014 | Bhattacharya | G07C 9/00174 380/259 |
| 2014/0108789 A1* | 4/2014 | Phatak | G06F 21/34 713/156 |

OTHER PUBLICATIONS

"Control Your Energy Future," Open ADR Alliance, accessed at: http://www.openadr.org/, accessed on Sep. 19, 2014, pp. 1-2.
"Cryptographic nonce," Wikipedia, accessed at http://web.archive.org/web/20130810094938/http://en.wikipedia.org/wiki/Cryptographic_nonce, last modified on Jun. 24, 2013, pp. 1-3.
"Demand Response Programs," accessed at http://regarchive.sdge.com/aboutus/longterm/longtermDemandResponse.shtml, accessed on Sep. 19, 2014, pp. 1-2.
"Providing Standards that help you control your world," accessed at: http://www.zigbee.org/Standards/Overview.aspx, Zigbee Alliance, accessed on Sep. 19, 2014, pp. 1-2.
"Summer Saver Program," accessed at: http://web.archive.org/web/20140811141244/http://www.sdge.com/save-money/summer-saver-program, SDGE connected, accessed on Sep. 19, 2014, pp. 1-2.
Alizadeh, M. et al., "Direct Load Management of Electric Vehicles," ICASSP, pp. 20 (May 2011).
Alizadeh, M. et al., "From Packet to Power Switching: Digital Direct Load Scheduling," IEEE Journal of Selected Areas in Communications (JSAC): Smart Grid Communications Series, pp. 1-10 (Feb. 15, 2012).
Drenker, S., and Kader, A., "Nonintrusive Monitoring of Electric Loads" IEEE Computer Applications in Power, vol. 12, No. 4, pp. 47-51 (Oct. 1999).
International Search Report and Written Opinion for counterpart International Patent Application No. PCT/US2013/055607 mailed Aug. 12, 2014.
Knott, J., "Powerline Leading Smart Grid Appliance Protocol," accessed at: http://www.cepro.com/article/powerline_leading_smart-grid_appliance_protocol/, Mar. 8, 2011, pp. 1-3.
Dipert, "Powerline: More Reliable Than Wireless? You've Got to Be Kidding . . . Yes?"; http://www.edn.com/electronics-blogs/brians-brain/4305028/Powerline-More-Reliable-Than-Wireless-You-ve-Got-To-Be-Kidding--Yes-, EDN Network, Feb. 23, 2009.
"What is Wi-Fi Protected Setup (WPS) or Push 'n' Connect?"; http://kb.netgear.com/app/answers/detail/a_id/96/~/what-is-wi-fi-protected-setup-, Netgear Support, retrieved on Oct. 2, 2014.

* cited by examiner

COMPUTER PROGRAM PRODUCT 700

SIGNAL BEARING MEDIUM 702

704 AT LEAST ONE OF

ONE OR MORE INSTRUCTIONS FOR ESTABLISHING A POWER LINE CONNECTION BETWEEN A WIRELESS ENABLED ELECTRONIC DEVICE AND ANOTHER DEVICE;
ONE OR MORE INSTRUCTIONS FOR COLLECTING A MESSAGE EXCHANGED BETWEEN THE WIRELESS DEVICE AND OTHER DEVICE OVER POWER LINE CONNECTION;
ONE OR MORE INSTRUCTIONS FOR COLLECTING THE MESSAGE AT A WIRELESS NETWORK ACCESS POINT;
ONE OR MORE INSTRUCTIONS FOR SYNTHESIZING A SECRET KEY BASED ON THE COLLECTED MESSAGE; AND/OR
ONE OR MORE INSTRUCTIONS FOR ESTABLISHING A CONNECTION WITH A WIRELESS NETWORK ACCESS POINT USING THE SECRET KEY SYNTHESIZED FROM THE COLLECTED MESSAGE.

| COMPUTER-READABLE MEDIUM 706 | RECORDABLE MEDIUM 708 | COMMUNICATIONS MEDIUM 710 |

FIG. 7

SECURE WIRELESS DEVICE CONNECTION USING POWER LINE MESSAGES

CROSS-REFERENCE TO RELATED APPLICATION

This application is the U.S. National Stage filing under 35 U.S.C. §371 of PCT Application Ser. No. PCT/US13/55607 filed on Aug. 19, 2013. The PCT Application is herein incorporated by reference in its entirety.

BACKGROUND

Unless otherwise indicated herein, the materials described in this section are not prior art to the claims in this application and are not admitted to be prior art by inclusion in this section.

Computing devices may be wireless enabled devices such as smart phones, laptops, tablets and other media devices. Wireless enabled devices may connect with a network employing a wireless connection via a wireless network access point. A wireless connection may be secured by establishing a password or encryption key, and the wireless connection may also be unsecured when passwords and/or encryption keys are not set up or utilized. Often times, a wireless connection, whether secured or unsecured may be compromised by attackers employing techniques to intercept and redirect the wireless connection. When the connection becomes comprised, personal and private information may be accessed by an attacker and the intercepted wireless connection may be exploited.

Rising power consumption and generation in a consumer environment has provoked the installation of smart meter devices at households and neighborhoods for monitoring and managing power consumption at confined locations. A smart meter device may be configured to communicate with a number of power consuming and/or generating devices and appliances at a location such as a household. Smart meters in a power grid may then be used to gather power consumption/generation information about houses, factories, and similar locations, as well as to send information or instructions to devices/appliances regarding power consumption/generation from a power grid management system (for example, a power utility).

SUMMARY

The present disclosure generally describes methods to establish a secure connection between a first communication device and a second communication device. An example method may include reaching an agreement with the second communication device over an unsecure connection on messages to be used for generating a secret key, collecting one or more messages between two devices according to the agreement, generating the secret key from the collected messages, and establishing the secure connection using the secret key.

The present disclosure also describes systems to a secure connection between a first communication device and a second communication device. An example system may include a first communication device and a second communication device. The first communication device may reach an agreement with the second communication device over an unsecure connection on messages to be used for generating a secret key, collect one or more messages between two devices according to the agreement, generate the secret key from the collected messages, and establish the secure connection using the secret key. The second communication device may collect the one or more messages and verify authenticity of the secret key to establish the secure connection.

The present disclosure further describes a wireless device to establish a secure connection with a utility based wireless network. The wireless device may include a wireless communication module, a processor coupled to the wireless communication module, where the processor may be configured to establish a power line connection between the wireless device and a smart meter, collect a message from the smart meter during the power line connection, synthesize a secret key based on the collected message, and establish a secure connection with a wireless network access point using the secret key synthesized from the collected message.

The present disclosure also describes a computer-readable memory device with instructions stored thereon, which when executed on one or more computing devices execute a method to establish a secure connection between a first communication device and a second communication device, the method including actions similar to those described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments as described herein.

DETAILED DESCRIPTION

Figure 1:
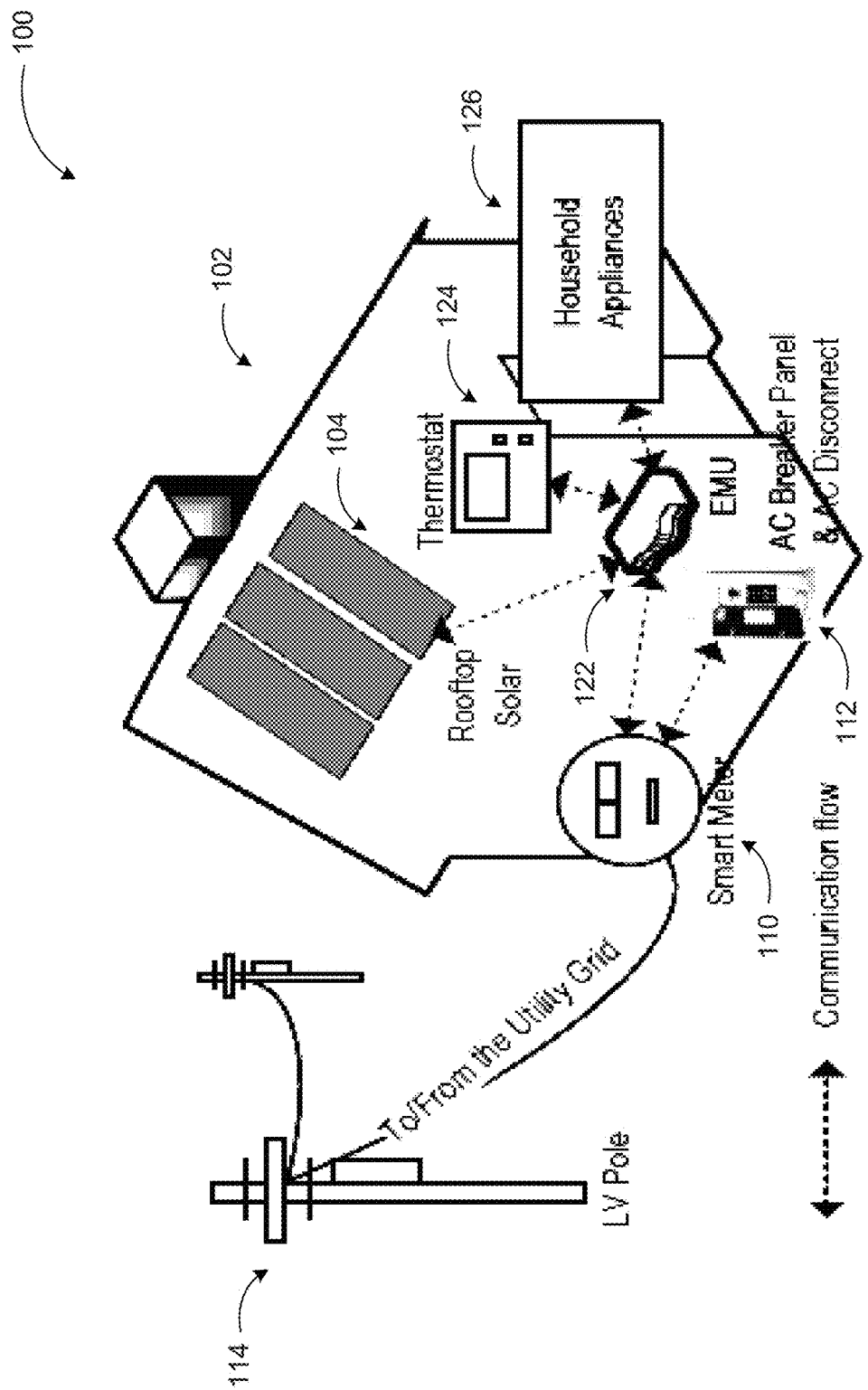
FIG. 1 illustrates example communications in a home area network (HAN) between a smart meter and an energy management unit (EMU) as well as between the EMU and a solar unit, appliances, and a thermostat.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to compositions, methods, apparatus, systems, devices, and/or computer program products related to establishing a secure connection for a wireless device using power line communication messages.

Briefly stated, technologies are generally provided to establish a secure connection between a wireless network access point and a wireless enabled device by sharing a secret key synthesized from one or more messages exchanged over power lines. Messages exchanged between devices within a location such as a household over power lines and/or with power utility control center may be collected, for example, communication messages between a wireless enabled device and a smart meter or any other device. The wireless enabled device and a wireless network access point may synthesize a secret key from the collected messages and share the secret key to establish a secure wireless connection over a channel that is not secure.

FIG. 1 illustrates example communications in a home area network (HAN) between a smart meter and an energy management unit (EMU) as well as between the EMU and a solar unit, appliances, and a thermostat, arranged in accordance with at least some embodiments as described herein.

As depicted, a diagram 100 includes a house 102 with a photovoltaic solar array 104, a smart meter 110, and an alternating current (AC) breaker panel and AC disconnect (ACBP & ACD) module 112. A utility pole 114 represents the power grid being connected to the house 102. The house 102 in the diagram 100 additionally includes an EMU 122, a thermostat 124, household appliances 126, and other household computing and non-computing devices. As shown in FIG. 1, the utility pole 114 representing the power grid is coupled to the smart meter 110, which is coupled to the ACBP & ACD module 112 and the EMU 122. The photovoltaic solar array 104 is also coupled to the EMU 122 along with the thermostat 124 and the household appliances 226.

The photovoltaic solar array 104 represents an on-location power generation system, which may alternatively be a wind-based power generation system, a No-mass power generation system, and/or other power generation systems. The photovoltaic solar array 104 may be operated for power consumption by the household and/or power contribution to the grid. There may be times when power demands of the grid do not justify receiving power generated by the house 102, or when the household power generation system may need to be isolated from the grid. On-location generated (for example, solar) power may be prevented from flowing to the grid by switching off the power line between the ACBP & ACD module 112 and the utility grid at the ACBP & ACD module 112. Actuation of the ACBP & ACD module 112 may allow the house 102 to continuously consume their on-location generated power even though the house 102 is effectively cut off from the grid.

Smart meters may be used at households or similar locations to manage power consumption and to provide surplus power back to the grid for a pre-arranged price or credit toward consumed power (in case of locations with power generation capability). To monitor and manage power consumption in a distribution grid via smart metering communications, the power network system may monitor and control grid-tied power generation modules associated with consumers through Home Area Networks (HANs) in individual households and Neighborhood Area Networks (NANs) between smart meters and utility control centers as discussed below in conjunction with FIG. 2. Smart metering communications (SMC) may employ wired or wireless communications based on a proprietary or standard protocol such as IEEE 802.15.4 standard in HAN. The communication protocol may be selected to provide reasonable data rates for small-size data packets with low power transmission while taking into account factors such as RF penetration and less interference.

The HAN may be composed of several components as shown in the diagram 100. The smart meter 110 may have multiple built-in functionalities supporting different wired and wireless communications protocols of power line communications and RF technologies, for example. In other examples, a separate communication modem (wired or wireless) may be used to facilitate communications with a utility control center (UCC). The photovoltaic solar array 104 may have sensors embedded in the inverter for collecting data of the module status (not shown).

The smart meter 110 may be configured to communicate with devices within the household, including appliances, wired and wireless computing devices, and other smart and/or non-smart devices. Devices and appliances configured to communicate and exchange information with other networks or devices may be referred to as ubiquitous computing devices or ubicomp devices. Example smart appliances may include household appliances 126 embedded with sensors and/or intelligent electronic devices to generate power consumption data, which may be communicated to the EMU 222. The thermostat 124 may perform Heating, Ventilating, and Air Conditioning (HVAC) control with communication capability. The EMU 122 may play the role of an intermediate node (for example, a gateway), which may coordinate the household's power consumption via appliances and thermostat, and record solar power generation. The smart meter may further measure and record both solar power generation/surplus and household's power consumption. The smart meter may be configured to send signals to one or more switches (for example, the ACBP & ACD module 112 in the diagram 100) directly or via the EMU 122 when disconnection/reconnection of the household power circuit from/to the grid is decided. The smart meter may communicate with devices and appliances, or ubicomp devices in the households to manage power consumption by transmitting messages to the appliances and devices.

While the examples described above focus on communications between devices in a household and a smart meter (and with a power utility control center), embodiments are not limited to those. Indeed, a wireless device may establish a secure communication session with another wireless device such as a wireless access point, for example, by collecting communication messages exchanged between any two devices (including, but not limited to, itself) over the power lines. For example, a smart television may agree with a wireless access point on which messages to collect (e.g., messages exchanged between a printer and a central device manager in a smart home). The smart television (and the wireless access point) may then use those messages to synthesize a secret key and use the secret key to establish a secure wireless communication link starting over unsecure media.

Furthermore, an agreement to use messages in generation of the secret key may be established in advance of the collection of messages (e.g., based on a preset standard) or following the collection of the messages. An example for the latter case may be the wireless device collecting one or more messages, sending an encrypted message to the other wireless device (e.g., the wireless access point), and informing the other wireless device which messages are to be used for the secret key. At that point, the other wireless device may use a rolling buffer to reconstruct from past messages.

Figure 2:
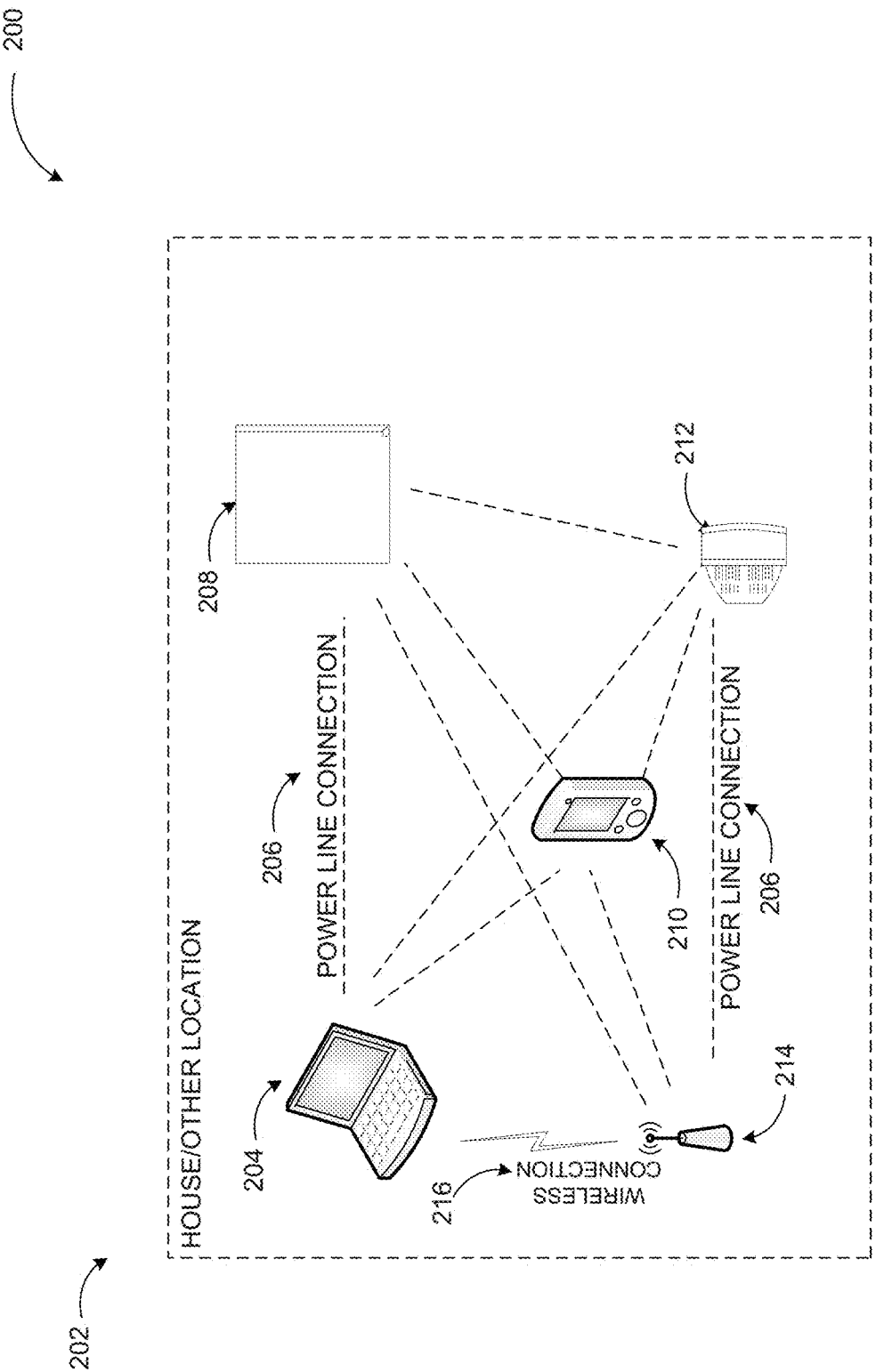
FIG. 2 illustrates an example communications infrastructure between devices at a location over a power line.

FIG. 2 illustrates an example communications infrastructure between devices at a location over a power line, arranged in accordance with at least some embodiments as described herein.

As depicted, a diagram 200 includes an example household 202 (or other similar location such as a business, school, hospital, etc.), where multiple devices and appliances, or ubicomp devices, may be operated. Some example devices and appliances that may be operated at the household 202 may include a computer 204, a telephone or smart phone 210, a television 212, a washing machine 208, a dryer, a stove, a dishwasher, and a router or wireless access point (WAP) 214. The devices and appliances located at the household 202 may be connected to a power line at least during some part of their operation (e.g., during charging).

In an example embodiment, the devices and appliances may communicate each other over the power line connection 206 by exchanging messages with each other. Additionally, some of the devices may be wireless enabled devices. For example, the devices may connect wirelessly to a wireless local area network (WLAN) through the wireless access point (WAP) 214. The computer 204 or other computing device such as a tablet or laptop, or the smart phone 210 may establish a wireless connection 216 with the WAP 214. The initial wireless connection between the wireless enabled devices and a WAP 214 may not be secure, however, due to weak password and encryption key setup and the ability for a wireless connection to be compromised from a fairly long distance. Furthermore, depending on a type of device, establishment of a secure connection may be cumbersome (input of credentials, password, etc.) or even impossible (a ubicomp device without human interface).

In a system according to embodiments, a secure connection may be established between two wireless (or wired) devices such as one of the wireless enabled devices in the diagram 200 and the WAP 214 by employing already established communications between the devices over the power line connection 206 within the household. For example, the WAP 214 may be configured to collect messages exchanged between the devices and appliances at the household over the power line connection 206. The WAP 214 may collect the messages specifically intended for the WAP 214 or messages not directly intended for the WAP 214, such as messages between other devices being exchanged over the power line connection 206. The WAP may synthesize a secret key from the collected messages. After the secret key has been synthesized from the collected messages, the WAP 214 may share the secret key with a wireless enabled device, which has synthesized the same secret key by collecting the same messages between the same two devices (as agreed upon between the WAP 214 and the wireless enabled device). The wireless enabled device may subsequently establish a secure wireless connection with the WAP 214 by exchanging the secret key.

The secure connection may also be established between other devices such as between the smart phone 210 and the television 212 by each device collecting messages exchanged over the power line between the two devices or between each device and another device over the power line. The exchange of synthesized secret key may be used to further establish a secure connection. For example, two devices may exchange the secret key over an open near field communication channel such as Bluetooth and then move to an encrypted WLAN connection. Moreover, the synthesized secret key based security mechanism may also be used to establish authentication and communication over a wired connection without the use of credentials such as user identification, password, etc.

Figure 3:
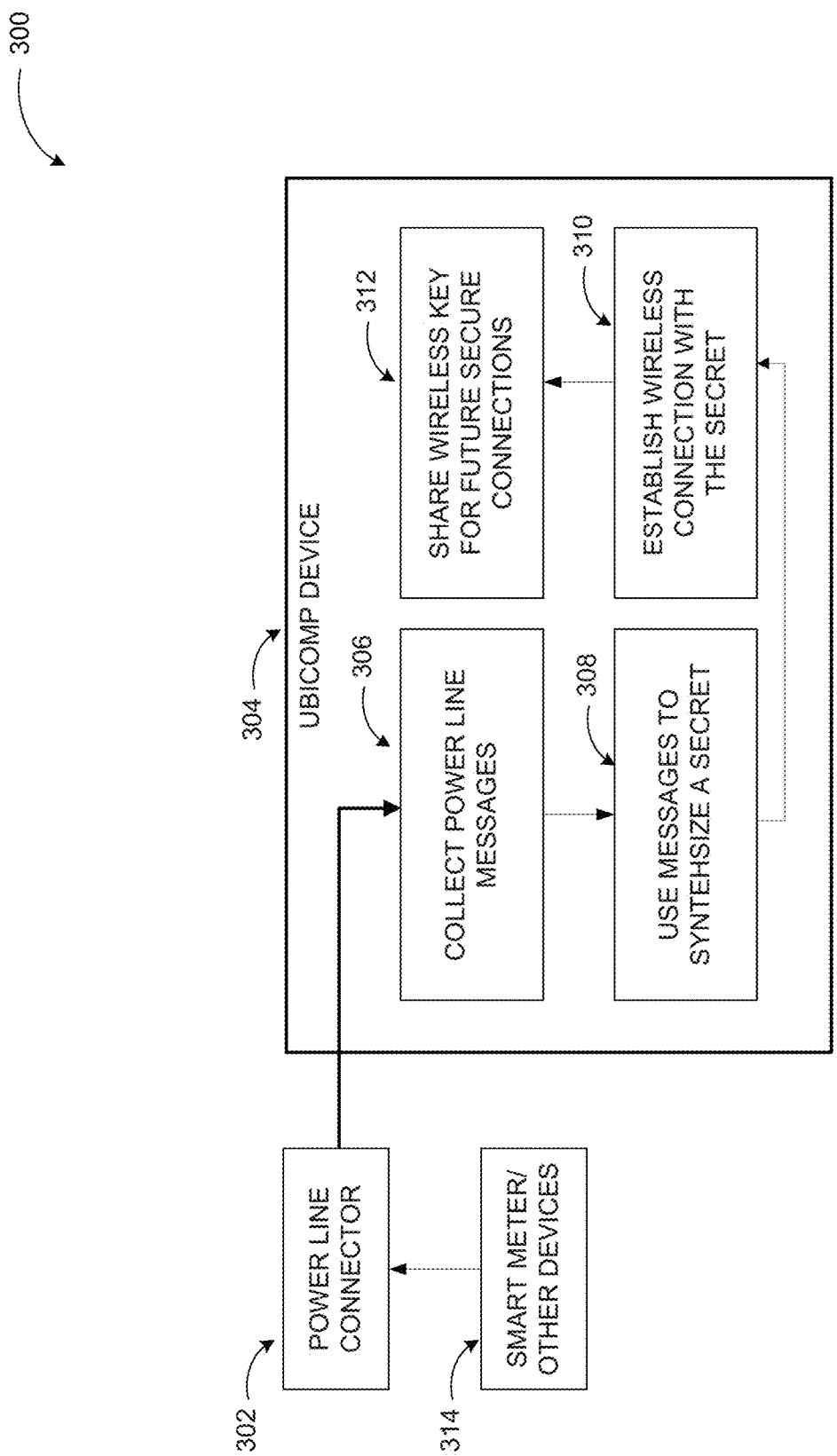
FIG. 3 illustrates a schematic for establishing a secure connection with a wireless device via devices connected over a power line.

FIG. 3 illustrates a schematic for establishing a secure connection with a wireless device via devices connected over a power line, arranged in accordance with at least some embodiments as described herein.

As depicted in a diagram 300, a wireless enabled device 304 may communicate with a smart meter or other devices 314 within a location such as a household or workplace over a power line connection 302. Example devices may include a wireless access point, such as a router, smart phones, telephones tablets, personal computers, laptops, media devices, computing devices, and household appliances.

In an example system according to embodiments, the wireless enabled device 304 may be a ubicomp device that may be configured to perform tasks including communication over secure or unsecure communication channels. If secure communication is needed or desired, the wireless enabled device 304 may collect one or more messages (306) over the power line. The messages may be directly associated with the wireless enabled device 304 such as messages between the device and a smart meter associated with the location. Alternatively, the collected messages may be associated with other devices such as communications between another device at the location and the smart meter or communication between any two devices at the location over the power line connection 302. The wireless enabled device 304 may then synthesize a secret key (308) based on the collected message(s), for example, by creating a hash from the message content such as identifier, time stamp, size of the message, or similar information.

To establish a secure communication with another device the wireless enabled device 304 may notify the other device over an unsecure communication channel about its desire to establish the secure communication. The notification may include information associated with which messages are to be used to synthesize the secret key. In other embodiments, the messages to be used for synthesizing the secret key may be known by the devices at the location and not exchanged every time a new connection is to be established. The wireless enabled device 304 may exchange its secret key with the other device, which may synthesize the same key collecting and using the same messages as the wireless enabled device 304 to establish the wireless connection (310). Optionally, the wireless enabled device 304 and the other device may share the synthesized secret key for future secure connections (312).

The other device may be a wireless access point (WAP), such as a router. The power line messages collected and used in synthesizing the secret key may be encrypted or not. As mentioned above, the messages may be exchanged between any two devices on the power line. The devices may not have to be continuously connected to the power line. For example, messages may be collected while a device is connected to the power line for charging or other temporary purposes.

In some example embodiments, after a secure connection has been established between the wireless enabled device and the other device by exchanging the secret key, both or one of the devices may delete the synthesized secret key. Deletion of the secret key may help to prevent future attacks or compromise of the secure connection. Additionally, at least one of the devices may be configured to maintain a list of collected messages from which the secret key may be synthesized. When a wireless enabled device attempts to exchange a secret key established from a recently collected message with the other device, the other device may reference the list of collected messages. Based on the list of recently collected messages, the other device may identify the message(s) from which the secret key was established in order to synthesize the same secret key to exchange with the wireless enabled device. In a further embodiment, in order to increase security of the secure connection, a filter may be attached on the power line connector 302 in order to prevent security tapping at power line connection 302.

Figure 4:
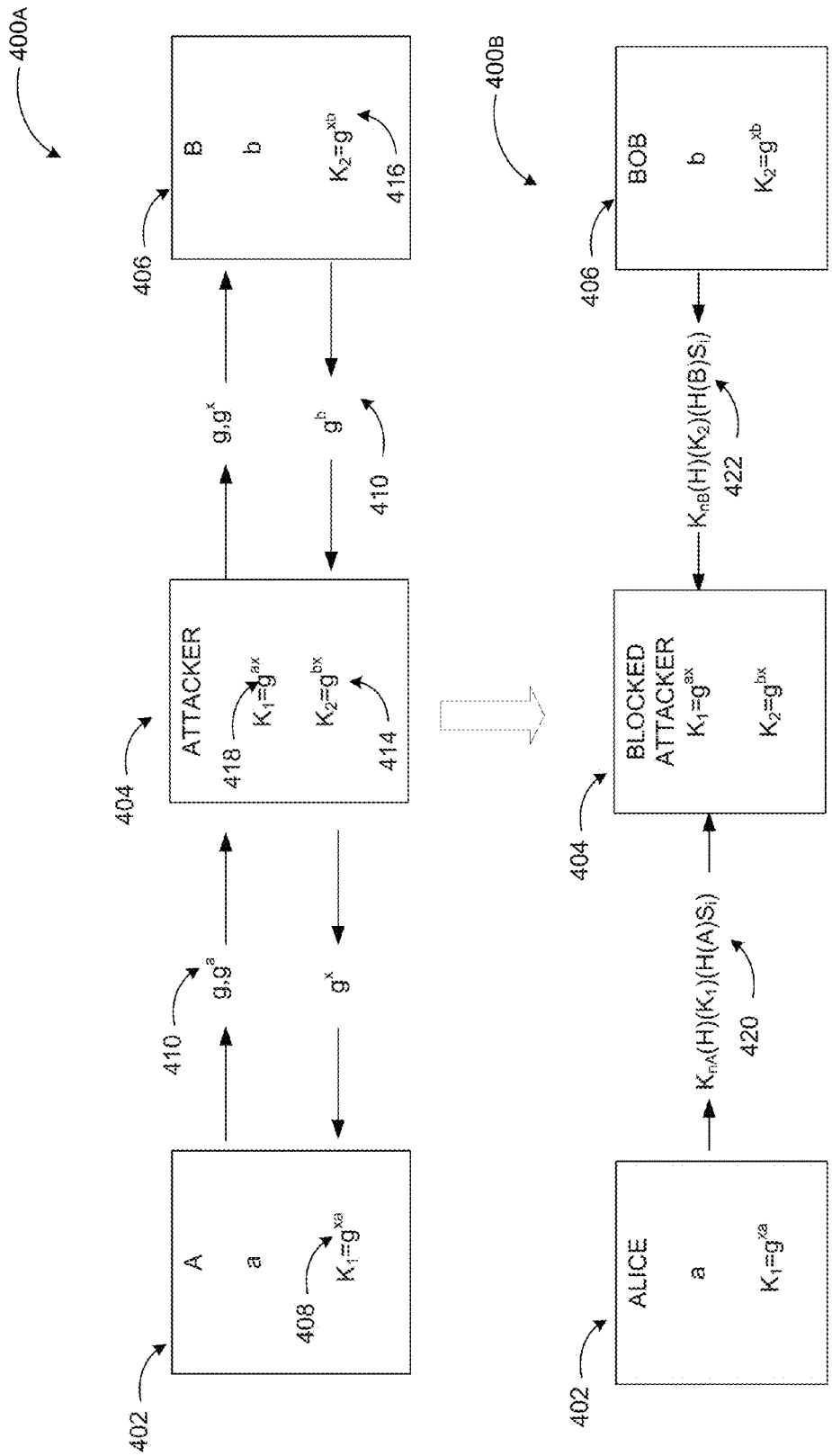
FIG. 4 illustrates an example exchange of a secret key.

FIG. 4 illustrates an example exchange of a secret key, arranged in accordance with at least some embodiments as described herein.

As previously described, some wireless connections may be unsecure and may be open to compromise by external attackers. An example middle-man attack is illustrated in a diagram 400A, where an attacker 404 may employ a long range antenna to observe wireless or short range communication exchanges between a device A 402 and a device B 406 from a distance. The attacker 404 may intercept exchanges 410 between the devices A 402 and B 406 and may pretend to be the device A 402 when interacting with the device B 406 and may pretend to be the device B 406 when interacting with the device A 402. The attacker 404 may deliver a fake key 408 to the device A 402 and may get a real key from the device B 406, and similarly may deliver a fake key 416 to the device B 406 and may get a real key from the device A 402. The attacker 404 may decrypt the received real keys 418, 414 and re-encrypt the keys so that neither of the devices A 402 and B 406 can recognize the key. Meanwhile, the attacker 404 may have full access and control of connections and exchanges between the devices A 402 and B 406. In such a scenario, after the attacker 404 has gained full control of the connection between A and B, the devices may not be able to communicate without the attacker 404 because they have different keys, K1 and K2, which were provided by the attacker 404. Because the devices A 402 and B 406 may have different keys, they may not recognize each other and may not be able to establish a connection with each other.

As illustrated in a diagram 400B, the attacker 404 may be prevented by using a shared secret key synthesized from a collected message as described above and shared between the devices A 402 and B 406. When the devices A 402 and B 406 have each synthesized the shared secret, they can send each other confirmation packets 420, 422 encrypted with a key, the shared secret, and an encrypted nonce or a bit string used once. Neither of the devices A 402 and B 406 may share the encrypted nonce until both have received the confirmation packets 420, 422 with the shared secret and the key, so neither of the devices A 402 and B 406 can decrypt the nonce until after both of the confirmation packets 420, 422 have been exchanged. When the attacker 404 intercepts the exchange, the attacker 404 cannot decrypt the confirmation packages without the nonce and cannot fake nor extract the secret to create new fake messages. The attacker 404 may either stop the confirmation packets during transmission which may halt communication between the devices A 402 and B 406 destroying the middle-man attack, or the attacker 404 may forward the confirmation packets unaltered. If the attacker 404 forwards the messages unaltered, then once the nonces are received, the devices A 402 and B 406 may observe that they have different keys (K1 and K2) which may indicate the presence of the attacker. If the attacker allows the devices A 402 and B 406 to use the same key, either K1 or K2, then the devices A 402 and B 406 may establish a direct connection with each other. The addition of the secret in the confirmation packet, therefore, may enable the devices A 402 and B 406 to communicate freely without compromise by the attacker and any middle-man attacker may be unable to hid or decrypt the communications between the devices A 402 and B 406 even if the attacker intercepts the confirmation packets.

FRI 5 illustrates a general purpose computing device, which may be used to maintain a registry for establishing a secure connection with a wireless device via a smart meter, arranged in accordance with at least some embodiments as described herein.

Figure 5:
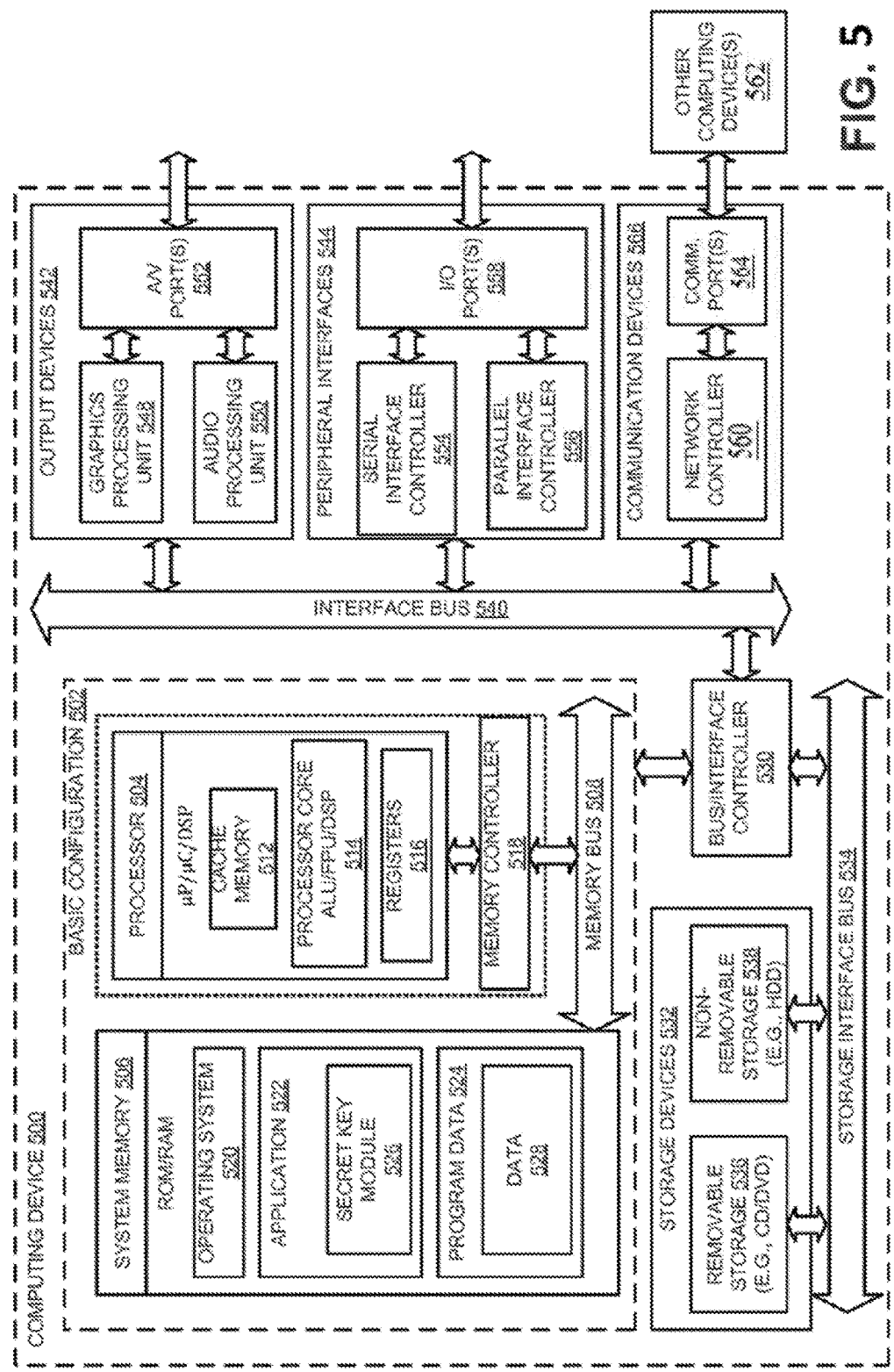
FIG. 5 illustrates a general purpose computing device, which may be used to maintain a registry for establishing a secure connection with a wireless device.

For example, the computing device 500 may be used as a server, desktop computer, portable computer, smart phone, special purpose computer, or similar device such as the smart meter 110 or the EMU 122 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in soave implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 may include a secret key module 526, which may be an integral part of the application 522 or a separate application on its own. The secret key module 526 may coordinate synthesizing a secret key from encrypted messages collected between various devices over a power line, as described herein. The program data 524 may include, among other data, data 528 related to collected messages, shared secret keys, encryption keys, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may also be implemented as a part of a general purpose or specialized server, mainframe, or similar computer that includes any of the above functions.

The computing device 500 may also be implemented as a personal computer including both laptop computer and non-laptop computer configurations.

Example embodiments may also include methods. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
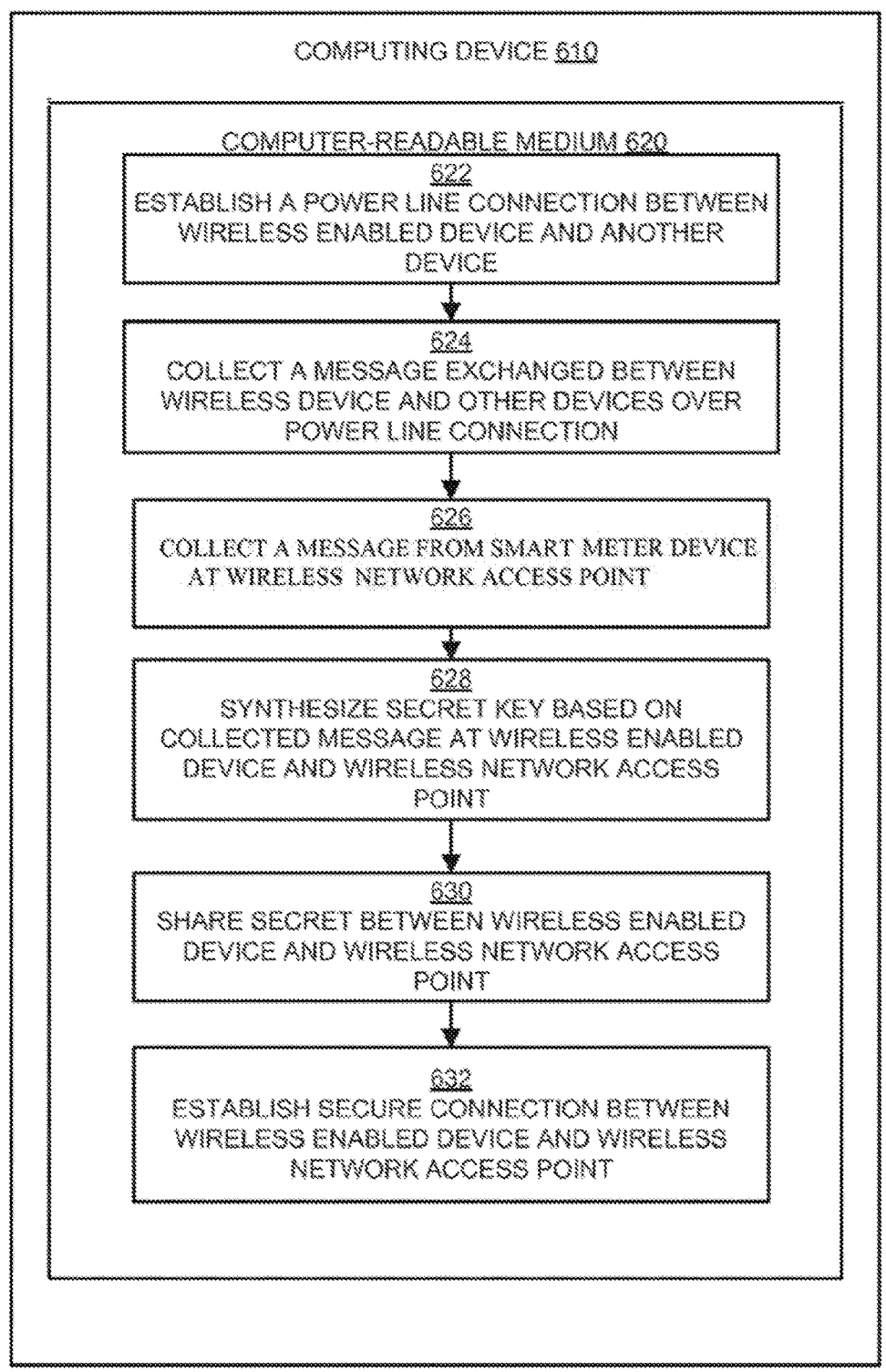
FIG. 6 is a flow diagram illustrating an example method that may be performed by a computing device such as the computing device in FIG. 5.

FIG. 6 is a flow diagram illustrating an example method that may be performed by a computing device such as the computing device in FIG. 5, arranged in accordance with at least some embodiments as described herein.

Example methods may include one or more operations, functions or actions as illustrated by one or more of blocks 622, 624, 626, 628, 630, and/or 631. The operations described in the blocks 622 through 634 may also be stored as computer-executable instructions in a computer-readable medium such as a computer-readable medium 620 of a computing device 610.

An example process for establishing a secure connection between a wireless network access point and a wireless enabled device by sharing a secret key synthesized from a message collected from a smart meter may begin with block 622, "ESTABLISH A POWER LINE CONNECTION BETWEEN WIRELESS ENABLED DEVICE AND ANOTHER DEVICE," where a wireless enabled device may establish a wired connection with another device via a power line at a location such as a household or an office, for example during charging of the device. An example wireless enabled device may include a tablet, smart meter, smart phone, laptop computer, or media device which may be connected with the power line by plugging in the device to charge the device. An example smart meter may be smart meter 110 of FIG. 1 configured to enable two-way communication with devices at a household or similar location.

Block 622 may be followed by block 624, "COLLECT A MESSAGE EXCHANGED BETWEEN THE WIRELESS DEVICE AND OTHER DEVICE OVER POWER LINE CONNECTION," where the wireless enabled device may collect an encrypted message transmitted by the other device over the power line connection. The encrypted message may be a message exchanged between the wireless device and the other device. The message may also be transmitted by a smart meter to one or more of devices configured to communicate with the smart meter. The collected message may be specifically intended for the wireless enabled device, or the collected message may be destined for another device.

Block 624 may be followed by block 626, "COLLECT A MESSAGE FROM SMART METER DEVICE AT WIRELESS NETWORK ACCESS POINT," where a wireless network access point may also collect the encrypted message. The wireless network access point may collect multiple encrypted messages and may maintain a list of recently collected messages.

Block 626 may be followed by block 628, "SYNTHESIZE A SECRET KEY BASED ON COLLECT MESSAGE AT WIRELESS ENABLED DEVICE AND WIRELESS NETWORK ACCESS POINT," where the wireless network access point and the wireless enabled device may synthesize a secret key based on the collected message.

Block 628 may be followed by block. 630, "SHARE SECRET BETWEEN WIRELESS ENABLED DEVICE AND WIRELESS NETWORK ACCESS POINT," where the wireless network access point and the wireless enabled device may share the secret key to establish a secure communication link over an unsecure channel such as a wireless home network or a near-field link (for example, Bluetooth).

Block 630 may be followed by block 632, "ESTABLISH SECURE CONNECTION BETWEEN WIRELESS ENABLED DEVICE AND WIRELESS NETWORK ACCESS POINT," where the wireless network access point and the wireless enabled device may establish a secure wireless connection based on sharing the secret key. The wireless network access point may provide an encryption key for enabling future secure wireless connections.

The blocks included in the above described process are for illustration purposes. Establishing a secure connection between a wireless network access point and a wireless enabled device by sharing a secret key synthesized from exchanged messages transmitted over a power line connection may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 7 illustrates a block diagram of an example computer program product, arranged in accordance with at least some embodiments as described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a secret key module 526 executed on the processor 504 may undertake one or more of the tasks shown in FIG. 7 in response to the instructions 704 conveyed to the processor 504 by the signal bearing medium 702 to perform actions associated with establishing a secure connection between wireless enabled devices via sharing a secret key synthesized from collected power line messages as described herein. Some of those instructions may include, for example, instructions for establishing a power line connection between a wireless enabled electronic device and another device, collecting a message exchanged between the wireless device and the other device over the power line connection, collecting the message at a wireless network access point, synthesizing a secret key based on the collected message and/or establishing a connection with the wireless network access point using the secret key synthesized from the collected message, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communications link, a wireless communication link, etc.). Thus, for example, the computer program product 700 may be conveyed to one or more modules of the processor 604 of FIG. 6 by an RF signal bearing medium, where the signal bearing medium 702 is conveyed by the wireless communications medium 710 (for example, a wireless communications medium conforming with the IEEE 802.11 standard).

The present disclosure generally describes methods to establish a secure connection between a first communication device and a second communication device. An example method may include reaching an agreement with the second communication device over an unsecure connection on messages to be used for generating a secret key, collecting one or more messages between two devices according to the agreement, generating the secret key from the collected messages, and establishing the secure connection using the secret key.

According to other examples, the first communication device and the second communication device may be wireless communication devices. Reaching the agreement with the second communication device over the unsecure connection may include communicating with the second device over one of a power line and an unsecure wireless connection. Reaching the agreement with the second communication device over the unsecure connection may also include one of reaching the agreement prior to collecting the one or more messages or subsequent to collecting the messages.

According to further examples, one of the two devices according to the agreement may be the first communication device. The other device according to the agreement may be the second communication device. The first communication device or the second communication device may be a wireless access point or a smart meter. The method may also include collecting the messages during a charging of the second communication device and collecting a message specifically destined for the first communication device or collecting a message not destined for the first communication device.

According to further examples, the method may further include deleting the secret key after establishing the secure connection with the second communication device, maintaining a list of recently collected messages, generating the secret key based on one or more of a timing, a size, and an identification of the collected messages, and/or hashing a table of at least one of: transmission times, timestamps, sizes, and identifications on the collected messages to synthesize the secret key. The method may also include using the secret key to establish future secure connections with the second communication device. One or more of the first communication device and the second communication device may be a smart meter, a telephone, a smart phone, a laptop, a personal computer, a tablet, a monitoring device, an appliance, or a household computing device.

According to yet other examples, the insecure connection may be established at a home, a business location, a hospital, a factory, a school, or a warehouse. The method may also include collecting messages exchanged between a wireless communication device and a smart meter over a power line. The method may further include attaching a filter to an external power line connected to the smart meter to prevent security tapping at the smart meter. The method may yet include configuring an application associated with the smart meter to control when messages can be collected and when one or more wireless communication devices can establish a connection with a wireless network access point using the secret key generated from the messages collected over the power line.

The present disclosure also describes systems to a secure connection between a first communication device and a second communication device. An example system may include a first communication device and a second communication device. The first communication device may reach an agreement with the second communication device over an unsecure connection on messages to be used for generating a secret key, collect one or more messages between two devices according to the agreement, generate the secret key from the collected messages, and establish the secure connection using the secret key. The second communication device may collect the one or more messages and verify an authenticity of the secret key to establish the secure connection.

According to some examples, after the secret key is exchanged to establish the secure connection, the first communication device may be configured to share an encryption key with the second communication device to enable establishment of future secure connections. The first communication device and the second communication device may be wireless communication devices. The unsecure connection may be over a power line or an unsecure wireless connection. The agreement with the second communication device may be reached one of prior to or subsequent to the collection of the one or more messages.

According to further examples, one of the two devices according to the agreement may be the first communication device. The other device according to the agreement may be the second communication device. The first communication device or the second communication device may be a wireless access point or a smart meter. The first communication device may also collect the messages during a charging of the second communication device, collect a message specifically destined for the first communication device, or collect a message not destined for the first communication device.

According to yet other examples, the first communication device may delete the secret key after establishing the secure connection with the second communication device, maintain a list of recently collected messages, and/or generate the secret key based on one or more of a timing, a size, and an identification of the collected messages. The first communication device may generate the secret key from the collected messages by hashing a table of at least one of: transmission times, timestamps, sizes, and identifications on the collected messages to synthesize the secret key. The first communication device may also use the secret key to establish future secure connections with the second communication device.

According to yet further examples, the first communication device and/or the second communication device may be a smart meter, a telephone, a smart phone, a laptop, a personal computer, a tablet, a monitoring device, an appliance, or a household computing device. The unsecure connection may be established at a home, a business location, a hospital, a factory, a school, or a warehouse. The first communication device may collect the one or more messages between a wireless communication device and a smart meter over a power line. A filler may be attached to an external power line connected to the smart meter to prevent security tapping at the smart meter. An application associated with the smart meter may control when messages can be collected and when one or more wireless communication devices can establish a connection with a wireless network access point using the secret key generated from the messages collected over the power line.

The present disclosure further describes a wireless device to establish a secure connection with a utility based wireless network. The wireless device may include a wireless communication module, a processor coupled to the wireless communication module, where the processor may be configured to establish a power line connection between the wireless device and a smart meter, collect a message from the smart meter during the power line connection, synthesize a secret key based on the collected message, and establish a secure connection with a wireless network access point using the secret key synthesized from the collected message.

According to some examples, the wireless device may be one or more of: a telephone, a smart phone, a laptop, a personal computer, a tablet, a monitoring device, an appliance, or a household computing device. The other device may be a smart meter, a telephone, a smart phone, a laptop, a personal computer, a tablet, a monitoring device, an appliance, or a household computing device. The wireless communication module is one of: a wireless local area network (WLAN) module, a near field communication module, and a cellular communication module.

According to other examples, the processor may collect a message specifically destined for the wireless device or collect a message not destined for the wireless device. The processor may also synthesize the secret key from the collected message by hashing a table of at least one of: transmission times, timestamps, sizes, and identifications on the collected message. After the secret key is exchanged to establish the secure connection with the wireless network access point, the wireless network access point may share an encryption key with the wireless device to enable establishing future secure wireless connections. The processor may further delete the secret key after the connection is established between the wireless network access and the wireless device using the secret key.

The present disclosure also describes a computer-readable memory device with instructions stored thereon, which when executed on one or more computing devices execute a method to establish a secure connection between a first communication device and a second communication device, the method including actions similar to those described herein.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing; descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to establish a secure connection between a first communication device and a second communication device, the method comprising:
   reaching an agreement with the second communication device over an unsecure connection on one or more messages to be used to generate a secret key;
   collecting the one or more messages from messages exchanged between the first communication device and a smart meter over a power line;
   generating the secret key from the one or more messages through use of one or more of: transmission times, timestamps, and identifications on the one or more messages; and
   transmitting a packet to the second communication device, the packet comprising the secret key, a shared key, and an encrypted nonce, wherein the second communication device is enabled to establish the secure connection with the first communication device in response to decrypting the encrypted nonce.

2. The method according to claim 1, wherein reaching the agreement with the second communication device over the unsecure connection includes communicating with the second communication device over one of a power line and an unsecure wireless connection.

3. The method according to claim 1, wherein reaching the agreement with the second communication device over the unsecure connection includes one of reaching the agreement prior to collecting the one or more messages or subsequent to collecting the one or more messages.

4. The method according to claim 1, further comprising:
   maintaining a list of one or more recently collected messages.

5. The method according to claim 1, wherein generating the secret key from the one or more messages comprises:
   hashing a table of at least one of: the transmission times, the timestamps, sizes, or the identifications on the one or more messages.

6. The method according to claim 1, further comprising:
   attaching a filter to an external power line connected to the smart meter to prevent security tapping at the smart meter.

7. The method according to claim 1, further comprising:
   configuring an application associated with the smart meter to control when the one or more messages can be collected and when one or more wireless communication devices can establish a connection with a wireless network access point through use of the secret key generated from the one or more messages collected over the power line.

8. A system to establish a secure connection between a first communication device and a second communication device, the system comprising:
   the first communication device configured to:
      reach an agreement, with the second communication device over an unsecure connection, on one or more messages to be used to generate a secret key;
      collect the one or more messages from messages exchanged between the first communication device and a smart meter over a power line;
      generate the secret key from the one or more messages through use of one or more of: transmission times, timestamps, and identifications on the one or more messages; and
   the second communication device configured to:
      detect a transmission of a packet from the first communication device to the second communication device, wherein the packet includes the secret key, a shared secret, and an encrypted nonce;
      verify an authenticity of the secret key to establish the secure connection; and
      in response to decryption of the encrypted nonce, establish the secure connection with the first communication device.

9. The system according to claim 8, wherein the first communication device and the second communication device include wireless communication devices.

10. The system according to claim 8, wherein the second communication device includes one of a wireless access point and a smart meter.

11. The system according to claim 8, wherein at least one of the first communication device and the second communication device includes one of a telephone, a smart phone, a laptop, a personal computer, a tablet, a monitoring device, an appliance, and a household computing device.

12. The system according to claim 8, wherein the unsecure connection is established at one of a home, a business location, a hospital, a factory, a school, and a warehouse.

13. A wireless device configured to establish a secure connection with a utility based wireless network, the wireless device comprising:
a wireless communication module; and
a processor coupled to the wireless communication module, wherein the processor is configured to:
establish a power line connection between the wireless device and another device;
collect a message exchanged between the wireless device and a smart meter over the established power line connection;
synthesize a secret key based on the message by hashing a table of one or more of: transmission times, timestamps, sizes, and identifications on the message; and
transmit a packet from the wireless device to the another device, wherein the packet includes the secret key, a shared secret, and an encrypted nonce, such that a secure connection is established with a wireless network access point between the wireless device and the another device in response to decryption of the encrypted nonce.

14. The wireless device according to claim 13, wherein the wireless communication module includes one of: a wireless local area network (MAN) module, a near field communication module, and a cellular communication module.

15. The wireless device according to claim 13, wherein the processor is configured to:
collect the message, which is specifically destined for the wireless device.

16. The wireless device according to claim 13, wherein the processor is configured to:
collect the message, which is not destined for the wireless device.

17. The wireless device according to claim 13, wherein after the secret key is exchanged to establish the secure connection with the wireless network access point, the wireless network access point is configured to share an encryption key with the wireless device to enable an establishment of future secure wireless connections.

18. The wireless device according to claim 17, wherein the processor is further confirmed to:
delete the secret key after the secure connection is established with the wireless network access point.

* * * * *

UNITED STATES PATENT AND TRADEMARK OFFICE
CERTIFICATE OF CORRECTION

PATENT NO. : 9,603,012 B2
APPLICATION NO. : 14/390383
DATED : March 21, 2017
INVENTOR(S) : Kruglick It is certified that error appears in the above-identified patent and that said Letters Patent is hereby corrected as shown below:

On the Title Page

Below Item (56), under "Primary Examiner", in Column 2, Line 1, delete "Jayesh Jhavei" and insert -- Jayesh Jhaveri --, therefor.

In the Specification

In Column 1, Line 8, delete "§371" and insert -- § 371 --, therefor.

In Column 2, Lines 2-3, delete "verify authenticity" and insert -- verify an authenticity --, therefor.

In Column 3, Line 21, delete "with power" and insert -- with a power --, therefor.

In Column 3, Line 50, delete "a No-mass" and insert -- a Bio-mass --, therefor.

In Column 5, Line 30, delete "communicate each" and insert -- communicate with each --, therefor.

In Column 8, Line 19, delete "FRI 5" and insert -- FIG. 5 --, therefor.

In Column 8, Line 44, delete "in soave" and insert -- in some --, therefor.

In Column 11, Line 3, delete "block. 630," and insert -- block 630, --, therefor.

In Column 12, Line 57, delete "insecure" and insert -- unsecure --, therefor.

In Column 13, Line 48, delete "limes," and insert -- times, --, therefor.

In Column 13, Line 62, delete "A filler" and insert -- A filter --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,603,012 B2

In Column 15, Line 30, delete "foregoing; descriptions." and insert -- foregoing descriptions. --, therefor.

In the Claims

In Column 20, Line 1, in Claim 14, delete "network (MAN)" and insert -- network (WLAN) --, therefor.

In Column 20, Line 20, in Claim 18, delete "confirmed to:" and insert -- configured to: --, therefor.